Patented Nov. 7, 1950

2,529,298

UNITED STATES PATENT OFFICE 2,529,298

SULFURIC ACID ALKYLATION OF THIOPHENE COMPOUNDS

Kenneth L. Kreuz, Beacon, and Robert T. Sanderson, Fishkill, N. Y., assignors to The Texas Company, New York, N. Y., a corporation of Delaware No Drawing. Application February 1, 1946, Serial No. 645,006

6 Claims. (Cl. 260—329)

This invention relates to a process for the production of aliphatic substituted thiophene compounds, particularly to a method of alkylating thiophene and its derivatives.

The preparation of alkyl-substituted thiophene compounds has previously been primarily of academic interest, and the methods employed in the preparation of such compounds have been adaptable solely to the production of small batch preparations. A summary of these methods of preparation are found in W. Steinkopf's "Die Chemi des Thiophens."

The principal methods of preparing alkyl thiophene homologs are the classical Fittig's Synthesis involving condensation of a thiophene halide with an alkyl halide and metallic sodium in the presence of ether, and the Clemmensen Reduction involving the reduction of ketone derivatives of thiophene with amalgamated zinc and hydrochloric acid. These reactions, although applicable to the preparation of a number of alkyl derivatives of thiophene, possess definite limitations both in flexibility of charge stocks and yields of end products, which restrict their use to small scale laboratory preparations. Furthermore, these types of reactions require, as charge compounds, specific classes of thiophene derivatives which contain selected polar groups in the positions in which alkylation or the formation of alkyl radicals are to be effected. These and other inherent disadvantages of the prior methods of alkylating thiophene compounds are overcome by the alkylation process of the present invention.

It has been discovered that aliphatic substituted thiophene compounds can be prepared by reacting a thiophene compound containing at least one reactive hydrogen atom with an alkylating agent containing three or more carbon atoms in the presence of a sulfuric acid catalyst in which the weight per cent concentration of sulfuric acid is not greater than about 80%. As distinguished from the aforementioned prior methods of alkylation, the thiophene charge compounds adaptable to direct alkylation by the subject process are those which contain a thiophene nucleus in the molecule and at least one reactive hydrogen atom in the thiophene nucleus. Such thiophene compounds include the substituted as well as the unsubstituted thiophene, together with the polynuclear and condensed thiophene compounds. The alkylation is effected in the position of one or more of the reactive hydrogen atoms, depending upon the mol ratios of alkylating agent to thiophene and the conditions of reaction.

When referring to the reactive hydrogen atoms of the thiophene nucleus in the description and claims of the invention, it is to be understood that reference is made to those hydrogen atoms of the nucleus which are capable of substitution by an alkyl or aliphatic radical. This distinction is necessary only in the case of the substituted thiophene compounds and particularly such compounds as are substituted by strongly negative radicals, e. g. $NO_2$, $COOH$, etc. As a general proposition the hydrogen atoms adjacent the heterocyclic sulfur, namely in the 2 and 5 positions, are the most reactive hydrogens and accordingly the initial alkylation is preferentially effected in these positions unless blocked by the presence of negative substituents in the molecule.

As previously indicated, the process of the invention is applicable to the alkylation of thiophene compounds with an alkylating agent containing at least 3 carbon atoms. The type of alkylating agents which may be used is analogous in composition to the alkylating agents used in the conventional sulfuric acid alkylation reactions and includes olefins, diolefins, alcohols, ethers, esters, etc. In the preferred embodiment of the invention preference is given to the use of olefins as the alkylating agent. These olefins may be any of the normally gaseous or normally liquid olefins or mixtures thereof containing at least three carbon atoms in the molecule as, for example, propylene, butylenes, amylenes, $C_4$ polymers such as di-isobutylene and tri-isobutylene, cross polymers of isobutylene and normal butylene, mixed or non-selective $C_3$–$C_4$ polymers and various fractions of thermally or catalytically cracked gasolines or polymer naphthas, etc. Applicable also are the diolefins, such as butadiene, various alcohols and ethers, such as isopropyl alcohol, tertiary butyl alcohol, secondary butyl alcohol, cyclohexanol, isopropyl ether, as well as the alkyl esters, such as the alkyl halides, sulfates, phosphates, etc.

One of the principal factors in the present alkylation process is the use of a sulfuric acid catalyst whose weight per cent concentration is not greater than approximately 80%. At these concentrations of acid alkylation proceeds with negligible sulfonation of the thiophene nucleus, whereas at concentrations greater than 85% thiophene undergoes sulfonation and decomposition with little or no alkylation. In general, the reaction is preferably conducted in the presence of sulfuric acid within the range of 70–80% concentration. Although there appears to be no definite lower limit on the concentration of acid which may be used, the practical limit of concentration is about 50%. As the concentrations of acid are decreased the rates of reaction are reduced proportionately. However, with increasing molecular weight of the alkylating agent decreased concentrations of acid may be used to effect alkylation at approximately the same reaction rate.

Although the preferred sulfuric acid catalyst is one employing water as the diluent, other inert diluents may be used to advantage. The use of diluents other than water, such as an alkyl sulfate or glacial acetic acid, is dependent to a large extent on the type of alkylating agent to be charged and its effect on aqueous sulfuric acid. Thus, a non-aqueous diluent will minimize undesirable side reactions at higher concentrations of acid as well as increase the catalyst life of the acid. Coincident with the use of non-aqueous diluents may be mentioned the substitution of the sulfuric acid in whole or in part by the spent alkylation acid from the sulfuric acid isoparaffin alkylation. This spent acid which ordinarily possesses a concentration of around 88–90% titratable sulfuric acid may be used as make-up acid in a continuous alkylation process or, as an originally charged catalyst with proper dilution to the desired concentration. When using the spent acid as catalyst, the organic content thereof must be considered as affecting the yield of the desired thiophene alkylate.

The temperature and pressure conditions under which the alkylation reactions are to be carried out most effectively will normally vary with each combination of thiophene compound and alkylating agent which may be employed. In general, however, the reaction may be conducted at temperatures in the range of —10 to 100° C. and preferably at 20 to 75° C., while the pressures may range from atmospheric to the vapor pressure of the reactant at the particular temperature employed.

In order that the invention may be fully understood reference is made to the following specific examples which describe the preferred methods of practicing the invention. It is to be understood that these examples are presented for illustrative purposes only and are not intended as limitations of the invention.

Example I 1000 grams of 70% sulfuric acid and 294 grams of thiophene were charged to a 2-liter batch bomb. To this mixture 144 grams of propylene were introduced and the temperature brought to about 68° C. After stirring for 1.5 hours, the pressure was released and the reaction mixture separated into an organic and acid layer. The organic layer was then steam distilled and rectified. The isopropylthiophene recovered represented a 22 mol per cent yield on the basis of propylene and a 21 mol per cent yield on the basis of thiophene.

Example II 420 grams of thiophene and 420 grams of 70% sulfuric acid were introduced into a 2-liter, 3-neck round bottom flask fitted with a mechanical stirrer and a gas inlet and a condenser cooled with dry ice. The temperature was maintained at 20–30° C. while 231 grams of isobutylene were added at such a rate as to maintain a slight reflux. The total addition time was 2.5 hours. After separation of the acid layer the organic product was steam-distilled and rectified to a yield of a monoalkylate consisting of tertiary butyl thiophene representing 48.3 mol per cent of the olefin charged and a dialkylate representing 16.6 mol per cent of the olefin charged. The boiling points of the mono- and dialkylates were 161 and 220° C., respectively.

Example III 420 grams of thiophene and 210 grams of 76% sulfuric acid were added to a 2-liter, 3-neck flask equipped with condenser and stirrer. 216 grams of butadiene were then added during 90 minutes while maintaining a temperature of 50 to 60° C. On extraction of the organic layer a butenylthiophene with a boiling point of 174–185° C. was obtained with a yield of 36.8 mol per cent on the basis of butadiene.

Example IV 840 grams of thiophene and 300 grams of 76% sulfuric acid were added to a 3-liter, 3-neck flask. To this mixture 350 grams of trimethylethylene were added over a period of 180 minutes while the temperature of the reaction vessel was maintained at a temperature of 40 to 50° C. Upon separation and rectification of the organic layer, a product boiling at 187° C. and believed to be tertiary amylthiophene was obtained with a yield of 56.8 mol per cent on the basis of olefin charged.

Example V 50 grams of methallylchloride were introduced into an agitated mixture of 100 grams of thiophene and 100 grams of 80 weight per cent sulfuric acid at a rate of one cc. per minute and at a temperature of 32° C. The reaction mixture was then separated and distilled at reduced pressure. 13 grams of material boiling at 88° C. at 10 mm. consisting largely of chlorobutylthiophene was obtained. The alkylate recovered represented a 6.5 mol per cent yield on the basis of the methallylchloride charged.

Example VI 25 grams of isobutylene were bubbled into a thoroughly agitated mixture of 59 grams of chlorothiophene and 59 grams of 80 per cent sulfuric acid at the rate of 50 grams per hour and at a temperature of 32° C. 79 grams of material insoluble in the sulfuric acid were separated from the acid. On distillation at reduced pressure 22 grams of tertiary butylchlorothiophene boiling at 203° C. were obtained. This represented a 28 mol per cent yield on the basis of the isobutylene charged.

Example VII 126 grams of isopropylthiophene and 425 grams of 80 per cent sulfuric acid were charged to an autoclave equipped with stirrer. To this mixture 55 grams of propylene were added and the reaction vessel maintained at 68–71° C. for 1.5 hours. The reaction product was then extracted, steam-distilled and rectified. 33 grams of diisopropylthiophene, boiling point 205–210° C. (corrected) (20% theoretical), and 29 grams of a material boiling mainly at 235° C. (corrected), which was presumably triisopropylthiophene, were recovered.

Obviously many modifications and variations of the invention, as hereinbefore set forth, may be made without departing from the spirit and scope thereof, and therefore only such limitations should be imposed as are indicated in the appended claims.

We claim:

1. A process for producing nuclear alkylated thiophene compounds which comprises reacting a thiophene compound containing at least one reactive hydrogen atom with an alkylating agent containing at least 3 carbon atoms under alkylating conditions at a temperature of −10 to 100° C. in the presence of a catalyst containing mainly sulfuric acid, in which catalyst the weight per cent concentration of sulfuric acid in solution is between 50 and 76 per cent.

2. A process according to claim 1 in which the concentration of sulfuric acid is between 70 and 76 per cent.

3. A process according to claim 1 in which thiophene is reacted with an alkylating agent.

4. A process according to claim 1 in which an olefin containing at least 3 carbon atoms is employed as the alkylating agent.

5. A process according to claim 1 in which the catalyst comprises sulfuric acid in aqueous solution.

6. A process for producing nuclear alkylated thiophene compounds which comprises reacting a thiophene compound containing at least one reactive hydrogen atom with an alkylating agent containing at least 3 carbon atoms under alkylating conditions and at temperatures in the range of −10 to 100° C. and pressures ranging from atmospheric to the vapor pressure of the reactants at the temperature of reaction, effecting said reaction in the presence of a catalyst containing sulfuric acid, in which catalyst the weight per cent concentration of sulfuric acid in solution is within the range of 50 to 76 per cent.

KENNETH L. KREUZ.
ROBERT T. SANDERSON.

REFERENCES CITED

The following references are of record in the file of this patent:

UNITED STATES PATENTS

| Number | Name | Date |
|---|---|---|
| 2,141,611 | Malishev | Dec. 27, 1938 |
| 2,396,144 | Anderson | Mar. 5, 1946 |
| 2,429,575 | Appleby | Oct. 21, 1947 |
| 2,482,084 | Caesar | Sept. 20, 1949 |

OTHER REFERENCES

Morton, "The Chemistry of Heterocyclic Compounds," pages 39, 40, McGraw-Hill, N. Y., 1946.